US006804329B2

United States Patent
Geck et al.

(10) Patent No.: US 6,804,329 B2
(45) Date of Patent: Oct. 12, 2004

(54) METHODS AND APPARATUS FOR ENABLING A NON-DID STATION OF A PBX OR MLTS TO RECEIVE A PSAP CALL BACK

(75) Inventors: Bertram Geck, Boca Raton, FL (US); Francisco Olympio Marcon da Rocha, Boca Raton, FL (US); Robinson Osmar Lima, Boca Raton, FL (US); Enoch Ragin, Jr., Boca Raton, FL (US); Luiz Cesar Zaniolo, Boca Raton, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 10/002,280

(22) Filed: Nov. 2, 2001

(65) Prior Publication Data

US 2003/0086538 A1 May 8, 2003

(51) Int. Cl.[7] .............................................. H04M 11/04
(52) U.S. Cl. ............................ 379/45; 379/37; 379/198
(58) Field of Search .............................. 379/37, 38, 39, 379/40, 41, 42, 43, 44, 45, 164, 165, 198, 268–269, 156; 455/404

(56) References Cited

U.S. PATENT DOCUMENTS 5,864,755 A * 1/1999 King et al. .................. 455/404

FOREIGN PATENT DOCUMENTS

| EP | 1009177 A2 | * | 6/2000 | ............ H04Q/7/26 |
| JP | 408307438 A | * | 11/1996 | ......... H04L/12/437 |

* cited by examiner

Primary Examiner—Melur Ramakrishnaiah

(57) ABSTRACT

Methods for enabling a non-DID station of a PBX or MLTS to receive a PSAP call back include assigning a special DID number for use by non-DID stations behind the PBX/MLTS, detecting when a non-DID station dials an emergency number, storing the station number of the non-DID station which dialed the emergency number, setting an emergency flag and a countdown timer, forwarding the special DID to the PSAP, detecting a call to the DID, routing the call to the DID to the stored station number so long as the timer has not expired, and dropping the emergency flag when the timer expires. An apparatus according to the invention includes a PBX switch coupled to a number of local stations, at least some of which are non-DID stations. The PBX preferably includes a processor, software, and storage registers. The PBX software is modified to carry out the methods described above.

15 Claims, 3 Drawing Sheets

METHODS AND APPARATUS FOR ENABLING A NON-DID STATION OF A PBX OR MLTS TO RECEIVE A PSAP CALL BACK

The subject matter of this application is related to co-owned co-pending applications: Ser. No. 09/816,627 filed on Mar. 23, 2001, and entitled "Priority Based Methods and Apparatus for Transmitting Accurate Emergency Location Identification Numbers (ELINs) from Behind a Multi-line Telephone System (MLTS)" and Ser. No. 09/816,823 filed on Mar. 23, 2001, entitled "Methods and Apparatus for Transmitting Accurate Emergency Location Identification Numbers (ELINs) From Behind a Multi-Line Telephone System (MLTS) After an Emergency Caller Disconnects", the complete disclosures of which are hereby incorporated by reference herein.

BACKGROUND OF THE INVENTION

1. Field of the Invention

This invention relates to telecommunications systems, especially PBX/Server systems, also referred to as Multi-Line Telephone Systems (MLTS). Specifically, the invention relates to completing an emergency, e.g. 911, call from a station/device behind a PBX or MLTS to a public safety answering point (PSAP) such that the PSAP can call back the emergency caller even though the station/device does not have a direct inward dial (DID) number.

2. Brief Description of Related Art

When a caller calls an emergency number, e.g. 911, the call is routed to a Public Safety Answering Point (PSAP). In some jurisdictions, regulatory agencies require that the caller's telephone number/callback number and/or precise physical location referred to as Location Identification Number (LIN), be automatically provided to the PSAP. This information is used to locate the caller and to call back to the caller should there be an unintended disconnect. This caller identification (i.e., telephone number and LIN) may be delivered to the PSAP either in-band (e.g., using DTMF/MF signaling) or out-of-band (e.g., using ISDN signaling) depending on the type of trunk circuit employed. For residential callers, the LIN may simply be the street address or the street address and apartment number. For commercial callers, the LIN needs to be more complex, for example, street address, floor number, room number, desk number. In some cases, the LIN is geodetic, i.e. includes earth coordinates or GPS data.

Modern PBX/MLTS systems provide many new features to accommodate the way modern businesses operate. For example, employees may be assigned personal identification numbers (PINs) that are used by the PBX/MLTS to identify the employee and assign a telephone number to him/her. For example, if an employee is assigned to a different location in the building, an automatic relocation feature can be activated using the PIN to reassign the employee's telephone number to the new location. Another feature of PBX/MLTS systems is that some telephones connected to the PBX/MLTS system may not be provided with the ability to receive direct dialed calls. For example, in a hotel, telephones in rooms are typically not capable of receiving a direct inward call from outside the hotel. All outside calls must pass through the switchboard operator. Still another feature of modern PBX/MLTS systems is that it is possible to make many or even all telephone lines available for use by multiline devices connected to the system. Thus, a caller from behind the PBX/MLTS system may be identified by many different telephone numbers.

In many situations, the only callback number provided from the PBX/MLTS system is the main billing number. In situations where the caller has no direct inward call receive capability, the PSAP cannot quickly call back the caller in the event of a disconnect. In the situation of a call from a multiline device, the telephone number from which the emergency call is made may not be the primary number for the caller and a return call to that number may cause a different device to ring rather than the caller's device. Moreover, the number used by the emergency caller may be associated with a LIN which is not the caller's LIN.

A method may be used for reporting the LIN of an emergency caller behind a PBX/MLTS system to a PSAP. The method includes assigning a port equipment number (PEN) to each port associated with the PBX/MLTS system, maintaining a database of LIN and callback numbers associated with PENs, identifying an emergency number when it is dialed, invoking an emergency service routing upon detection of a dialed emergency number, associating the PEN with the dialer of the emergency number, retrieving the LIN and callback number from the database, and transmitting the LIN and callback number to the PSAP. The apparatus that may be used in conjunction with this method includes database management means, emergency number detection means, call routing means, ISDN and non-ISDN signaling means. The apparatus may be configured so that either the callback number, the LIN, or both are transmitted to the PSAP. Further, the apparatus may be configured to recognize multiple emergency numbers and to give emergency calls priority over non-emergency calls. The specificity of the LIN can be determined by the system administrator and additional text information may be associated with the LIN. The call routing and signaling means are capable of routing the emergency call through multiple PBX/MLTS systems before reaching the public network.

However, a situation may occur where a caller immediately disconnects an emergency call before the LIN/callback number can be transmitted to the PSAP. Such a situation might occur in different ways, e.g. criminal activity forcing unintentional hang-up, accidental dialing followed by intentional hang-up, an emergency requiring immediate flight, etc. The PSAP may receive the primary billing number but not the accurate LIN/callback number. This results in ambiguity for the PSAP. It may be impossible to determine whether the call was a mistake or whether and where the emergency is.

Another method may be used for accurately reporting the LIN of an emergency caller behind a PBX/MLTS system to a PSAP even when the caller immediately disconnects. According to this method, LIN/callback number information is buffered immediately upon the detection of an emergency call, upon the detection of an on-hook event prior to transmitting the LIN/callback number information, a timer is activated and LIN/callback number information is transmitted from the buffer before the timer expires. When the timer expires, the call is disconnected.

However, a situation may occur where the caller does not have DID capability such as in a hotel room. In the state of the art PBX/MLTS systems it is usually impossible to provide an accurate DID call back number to a PSAP when the call is made from a station which is not able to receive direct inward calls.

SUMMARY OF THE INVENTION

It is therefore an object of the invention to provide methods and apparatus for accurately reporting the DID of an emergency caller behind a PBX/MLTS system to a PSAP.

It is also an object of the invention to provide methods and apparatus for providing a DID for an emergency caller behind a PBX/MLTS system to a PSAP where the emergency caller is not normally allowed to receive direct incoming calls.

It is another object of the invention to provide methods and apparatus for providing a DID for an emergency caller behind a PBX/MLTS system to a PSAP that do not interfere with the features of the PBX/MLTS.

In accord with these objects which will be discussed in detail below, the methods according to the invention include assigning a special DID number for use by non-DID stations behind the PBX/MLTS, detecting when a non-DID station dials an emergency number, storing the station number of the non-DID station which dialed the emergency number, setting an emergency flag and a countdown timer, forwarding the special DID to the PSAP, detecting a call to the DID, routing the call to the DID to the stored station number so long as the timer has not expired, and dropping the emergency flag when the timer expires. An apparatus according to the invention includes a PBX switch coupled to a number of local stations, at least some of which are non-DID stations. The PBX preferably includes a processor, software, and a number of storage registers. The PBX software is modified to carry out the methods described above.

According to an alternate embodiment of the invention, several special DID numbers are reserved for use by groups of non-DID stations in different locations at a facility. For example, in a facility which spans a first and second floor and utilizes a single PBX switch for stations on both floors, it may be advantageous to provide one DID number for the non-DID stations on one floor and a different DID number for the non-DID stations on the other floor.

DETAILED DESCRIPTION

Figure 1:
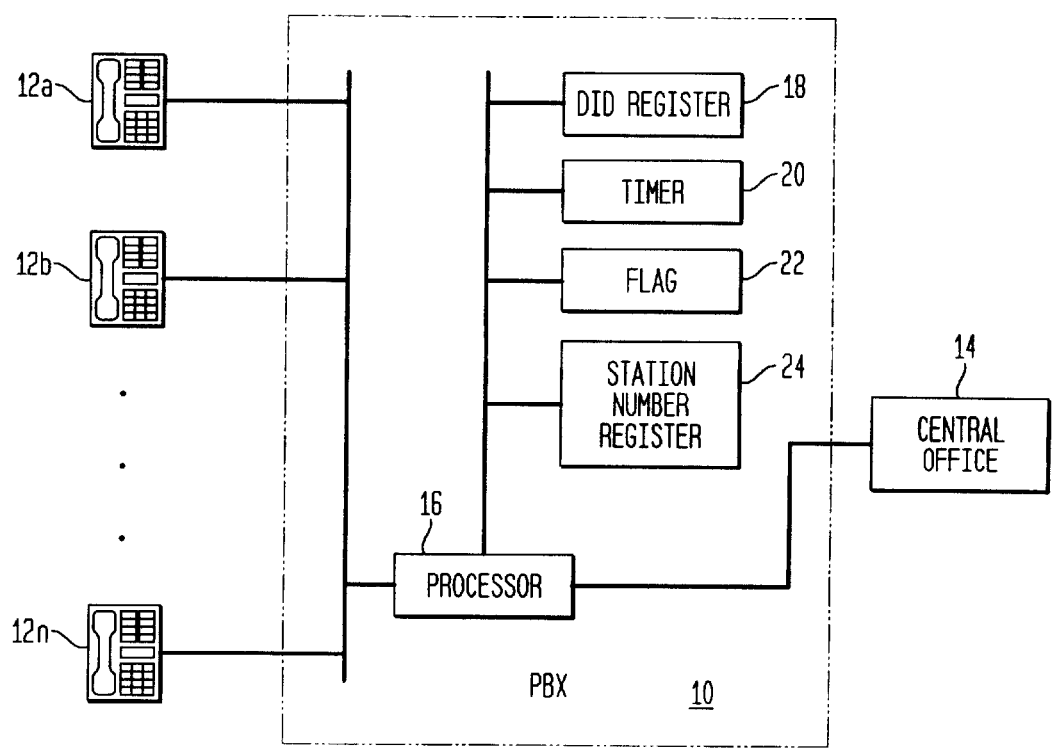
FIG. 1 is a high level block diagram of an apparatus according to the invention.

Turning now to FIG. 1, an apparatus according to the invention includes a PBX switch 10 coupled to a number of local stations 12a, 12b, . . . 12n, at least some of which are non-DID stations. PBX 10 is also coupled to a Central Office 14.

PBX 10 preferably includes a processor 16, a register 18 for storing the special DID number(s) which will be used for non-DID stations, a countdown timer 20, an emergency flag register 22 for indicating when an emergency number has been dialed and the timer is still running, and a station number register 24 for storing the station number of the non-DID station which most recently dialed an emergency number. The processor 16 is coupled to each of these items via buses and other interfaces (not shown) as will be appreciated by those skilled in the art. Those skilled in the art will also appreciate that the processor 16 is driven by software (not shown) which enables it to perform the methods described in detail below with reference to FIG. 2.

Figure 2:
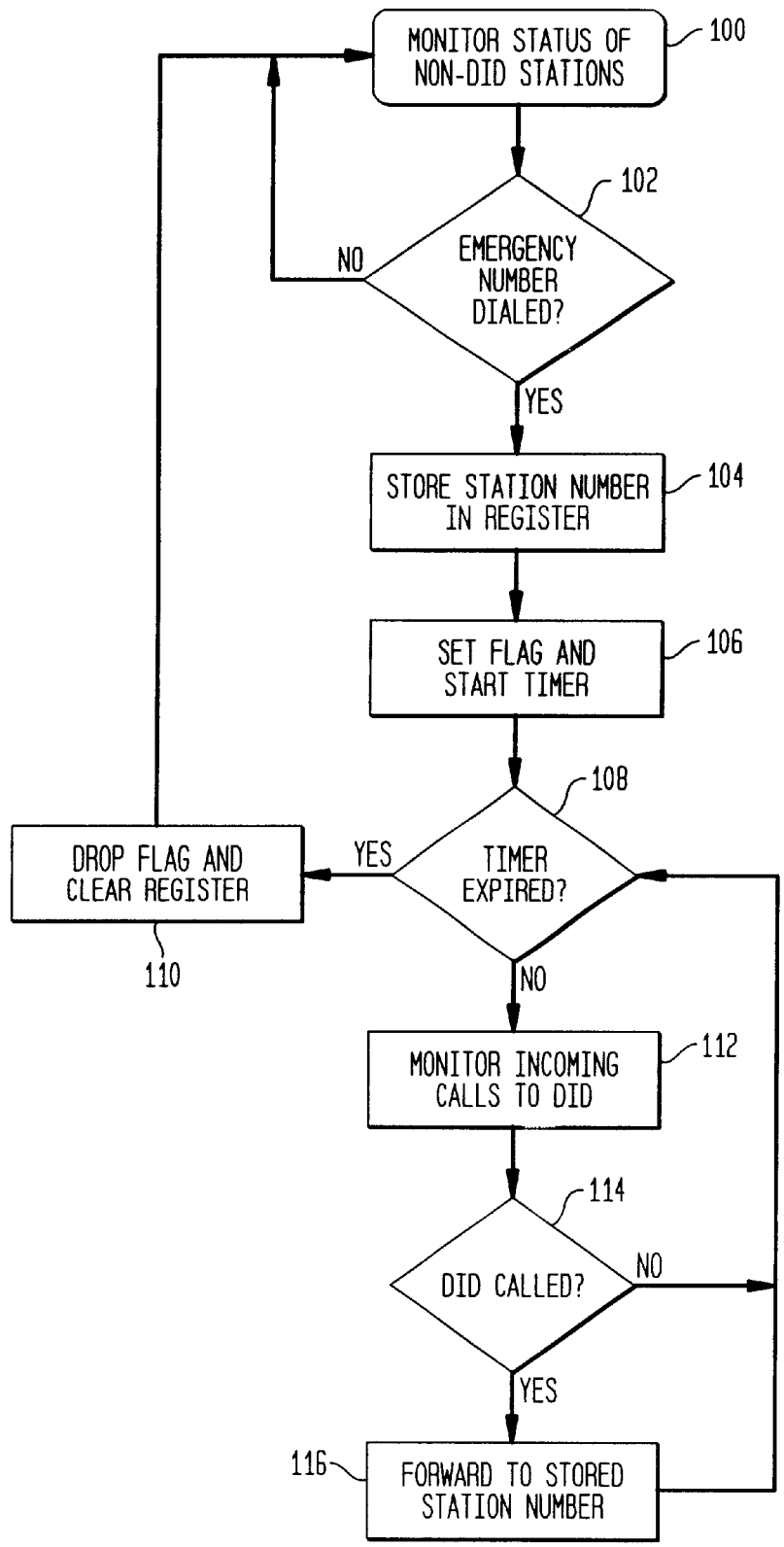
FIG. 2 is a high level flow chart illustrating methods of the invention.

Referring now to FIG. 2, the preferred methods of the invention are illustrated in a flow chart which explains how the processor (16 in FIG. 1) is driven by software according to the invention. The preferred methods of the invention include monitoring the status of non-DID stations as illustrated at 100 and determining whether an emergency number has been dialed as illustrated at 102. If it is determined at 102 that a non-DID station has dialed an emergency number, the station number is stored in the register (24 in FIG. 1) as illustrated at 104 in FIG. 2. In addition, the flag (22 in FIG. 1) is set and the timer (20 in FIG. 1) is started counting down as illustrated at 106 in FIG. 2. The count down timer (20 in FIG. 1) is monitored as illustrated at 108 in FIG. 2 to determine when it expires. Incoming calls to the DID number (stored in register 18 in FIG. 1) are also monitored as illustrated by 112 in FIG. 2. If it is determined at 114 and 108 that no call to the DID number is received before the timer expires, the flag (22 in FIG. 1) is dropped and the register (24 in FIG. 1) containing the station number of the station which made the emergency call is cleared as illustrated at 110. Otherwise, if a call to the DID number is detected at 114 before the timer expires at 108, the call is forwarded to the station number stored in the register 24 in FIG. 1, as illustrated at 116. Following the forward of the call, the process continues to monitor the timer at 108 and the incoming calls at 112 until the timer expires. The duration of the countdown timer may be set to any reasonable time such as, in preferred embodiments, five to ten minutes. It should be remembered that the timer duration must include the time of the outgoing emergency call since it is set as soon as the emergency call is made as well as the expected time until a call back from the PSAP would be received.

Though not illustrated in the Figures, according to a presently preferred embodiment, if a call to the DID number is received when the flag (22 in FIG. 1) is not set, the call is forwarded to a default number chosen by the administrator of the PBX. In addition, according to a presently preferred embodiment, data (e.g. time, date, duration, calling station number, called number) regarding emergency calls is stored and is available for access from any station coupled to the PBX.

Figure 3:
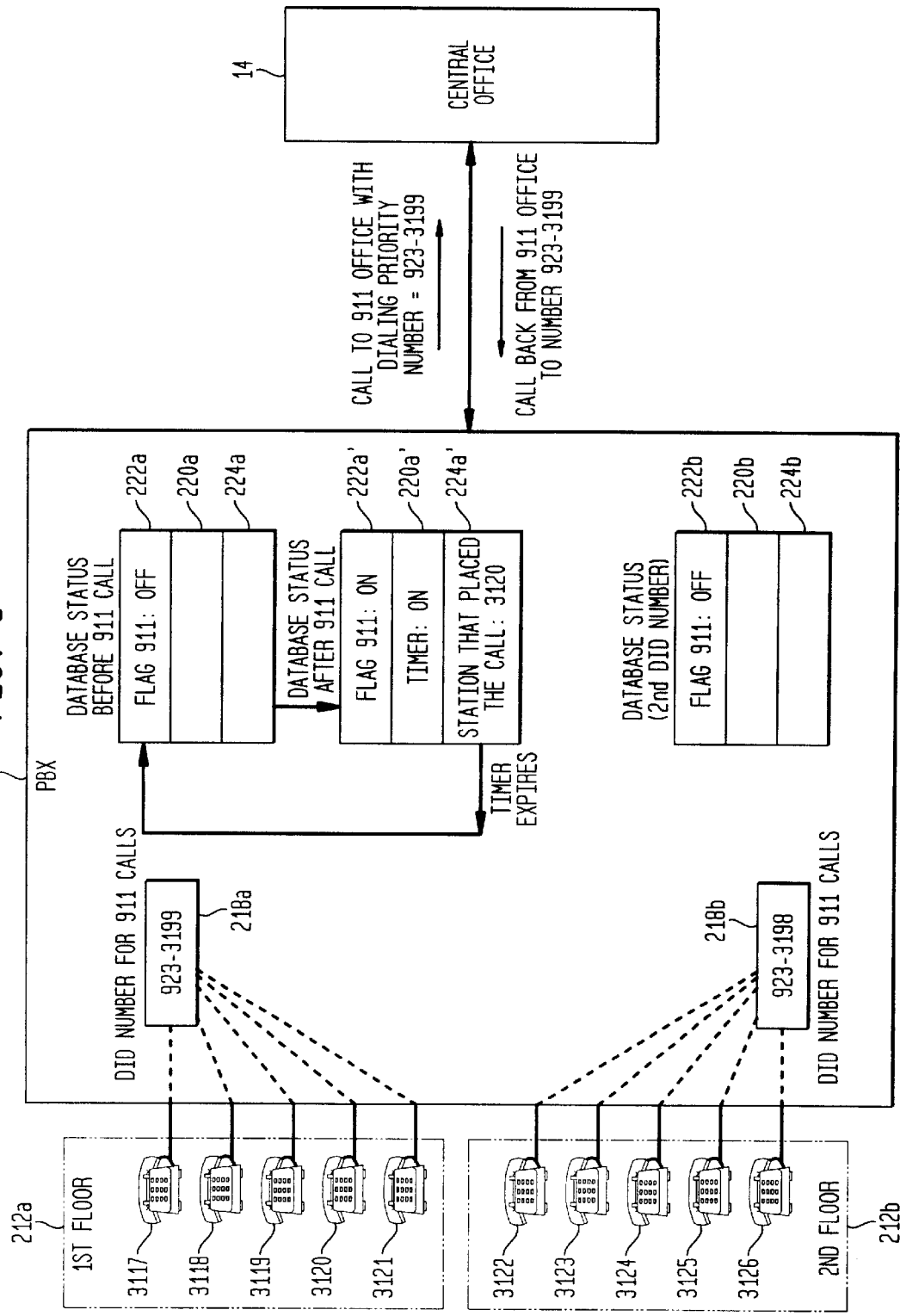
FIG. 3 is a high level block diagram illustrating an embodiment of an apparatus of the invention in which multiple DID numbers are utilized.

FIG. 3 illustrates an alternate preferred embodiment of an apparatus according to the invention. As shown in FIG. 3, PBX 210 is coupled to a plurality of first floor non-DID stations 212a and a plurality of second floor non-DID stations 212b as well as to the central office 14. As shown, the first floor stations have local numbers from 3117 to 3121 and the second floor stations have local numbers from 3122 to 3126. According to this embodiment, the first floor non-DID stations are assigned a special DID (923-3199) which is stored in register 218a and the second floor non-DID stations are assigned a special DID (923-3198) which is stored in register 218b. Separate timers, flag registers, and station number registers are used for the first floor and the second floor. In particular, the first floor stations are associated with a timer 220a, a flag register 222a and a station number register 224a. The second floor stations are associated with a timer 220b, a flag register 222b and a station number register 224b.

Operation of the apparatus shown in FIG. 3 is substantially the same as described in FIG. 2 except that two separate DID numbers, timers, and sets of registers are used. The state of the registers for the first floor stations during an emergency call from a first floor station is illustrated by reference numerals 220a', 222a', 224a'. When any station from the first floor places the call, the calling party number will be 923-3199. The PSAP knows according to its database that the first floor of the building placed the call. If the PSAP decides to call the user back, there will be a call to 923-3199 to the PBX. Receiving the call, the PBX will notice that the incoming call is a callback from an emergency call and forward it to the station stored in the memory. With this embodiment, it is possible for a station on the first floor to call one emergency number while a station on the second floor contemporaneously calls a second emergency number. Moreover, first and second floors may contemporaneously call the same emergency number to report two different emergencies (it is possible to have several 911 calls at the same time).

There have been described and illustrated herein methods and apparatus for enabling a non-DID station of a PBX or MLTS to receive a PSAP call back. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A method for enabling a non-DID station of a PBX having both non-DID stations and at least one DID capable station to receive a PSAP callback, comprising:
   a) assigning a special DID for use by all non-DID stations of the PBX;
   b) detecting when a non-DID station places a call to an emergency number;
   c) storing emergency call data so that it is accessible from any station (DID or non-DID) connected to said PBX; and
   d) forwarding the special DID number to the PSAP associated with the emergency number called.

2. A method according to claim 1, further comprising: e) storing the number of the non-DID station which called the emergency number; f) monitoring incoming calls to the special DID number; and g) forwarding calls to the special DID number to the non-DID station which called the emergency number.

3. A method according to claim 2, further comprising:
   h) starting a countdown timer when a call to an emergency number from a non-DID station is detected, wherein said step of forwarding is performed only if the countdown time has not expired.

4. A method according to claim 3, further comprising:
   i) raising a flag when the countdown timer is started; and
   j) lowering the flag when the countdown timer is expired.

5. A method according to claim 4, further comprising:
   k) clearing from storage the number of the non-DID station which called the emergency number.

6. A method according to claim 1, wherein:
   the PBX includes a first plurality of non-DID stations and a second plurality of non-DID stations, and
   said step of assigning includes assigning a first special DID number for use by all of the first plurality of non-DID stations and assigning a second special DID number for use by all of the second plurality of non-DID stations.

7. A method according to claim 6, wherein:
   said step of detecting includes detecting whether the non-DID station which placed the call to an emergency number is one of the first plurality of non-DID stations or one of the second plurality of non-DID stations.

8. A method according to claim 7, wherein:
   said step of forwarding includes forwarding the first special DID number if the non-DID station which placed the call to an emergency number is one of the first plurality of non-DID stations and forwarding the second special DID number if the non-DID station which placed the call to an emergency number is one of the second plurality of non-DID stations.

9. An apparatus for enabling a non-DID station of a PBX having both non-DID stations and at least one DID capable station to receive a PSAP callback, comprising:
   a) first storage means for storing a special DID for use by all non-DID stations of the PBX;
   b) first detection means for detecting when a non-DID station places a call to an emergency number;
   c) first storing means for storing emergency call data so that it is accessible from any station (DID or non-DID) connected to said PBX; and
   d) first forwarding means coupled to said first storage means and said first detection means for forwarding the special DID number to the PSAP associated with the emergency number called.

10. An apparatus according to claim 9, further comprising:
    e) second storage means coupled to said first detection means for storing the number of the non-DID station which called the emergency number;
    f) second detection means for detecting incoming calls to the special DID number;
    g) second storing means for storing emergency call data so that it is accessible from any station (DID or non-DID) connected to said PBX; and
    h) second forwarding means coupled to said second storage means and said second detection means for forwarding calls to the special DID number to the non-DID station which called the emergency number.

11. An apparatus according to claim 10, further comprising:
    i) a countdown timer coupled to said first detection means such that said timer begins to count down when a call to an emergency number from a non-DID station is detected, wherein
    said second forwarding means is disabled when said timer expires.

12. An apparatus according to claim 11, further comprising:
    j) a flag coupled to said countdown timer such that said flag is raised when the countdown timer is started and said flag is lowered when said countdown timer is expired.

13. An apparatus according to claim 12, wherein:
    said second storage means is coupled to said countdown timer such that the number of the non-DID station which called the emergency number is cleared from said second storage means when said countdown timer expires.

14. An apparatus according to claim 9, wherein:
    the PBX includes a first plurality of non-DID stations and a second plurality of non-DID stations, and
    said first storage means includes means for storing a first special DID number for use by all of the first plurality of non-DID stations and means for storing a second special DID number for use by all of the second plurality of non-DID stations.

15. An apparatus according to claim 14, wherein:
    said first detection means includes means for detecting whether the non-DID station which placed the call to the emergency number is one of the first plurality of non-DID stations or one of the second plurality of non-DID stations.

* * * * *